(12) United States Patent
Friedman et al.

(10) Patent No.: US 11,622,004 B1
(45) Date of Patent: Apr. 4, 2023

(54) TRANSACTION-BASED RELIABLE TRANSPORT

(71) Applicant: Mellanox Technologies, Ltd., Yokneam (IL)

(72) Inventors: Yamin Friedman, Jerusalem (IL); Idan Burstein, Akko (IL); Ariel Shahar, Jerusalem (IL); Diego Crupnicoff, Buenos Aires (AR); Roee Moyal, Yokneam Illit (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/890,385

(22) Filed: Aug. 18, 2022

Related U.S. Application Data

(60) Provisional application No. 63/337,222, filed on May 2, 2022.

(51) Int. Cl.
*H04L 67/1097* (2022.01)

(52) U.S. Cl.
CPC .................. *H04L 67/1097* (2013.01)

(58) Field of Classification Search
CPC .................................................. H04L 67/1097
See application file for complete search history.

(56) References Cited

U.S. PATENT DOCUMENTS

| 5,629,948 | A | 5/1997 | Hagiwara et al. |
| 6,434,620 | B1 | 8/2002 | Boucher et al. |
| 6,622,194 | B1 * | 9/2003 | Lee ............... G06F 13/4269 710/39 |

(Continued)

FOREIGN PATENT DOCUMENTS

| CN | 1794214 | A | | 6/2006 | |
| JP | 2007234017 | A | * | 9/2007 | ............ G06F 3/0611 |

(Continued)

OTHER PUBLICATIONS

Regnier et al., "ETA: Experience with an Intel Xeon Processor as a Packet Processing Engine", IEEE Micro, vol. 24, issue 1, pp. 24-31, Jan.-Feb. 2004.

(Continued)

*Primary Examiner* — Shean Tokuta
(74) *Attorney, Agent, or Firm* — Kligler & Associates Patent Attorneys Ltd

(57) ABSTRACT

A method for communication includes receiving in a network device work requests posted by a host processor to perform a series of communication transactions, including at least a first transaction and a second transaction comprising first and second operations to be executed in a sequential order in response to corresponding first and work requests posted by the host processor. In response to the work requests, data packets are transmitted over a network from the network device to a destination node and corresponding responses are received from the destination node. Based on the received responses, completion of the first operations in the first transaction is reported from the network device to the host processor according to the sequential order, and completion of the second operation in the second transaction is reported from the network device to the host processor regardless of whether the first transaction has been completed.

20 Claims, 3 Drawing Sheets

(56) References Cited

U.S. PATENT DOCUMENTS

| | | | |
|---|---|---|---|
| 6,848,029 B2 | 1/2005 | Coldewey | |
| 6,981,074 B2 | 12/2005 | Oner et al. | |
| 7,035,214 B1 | 4/2006 | Seddigh et al. | |
| 7,076,578 B2 | 7/2006 | Poisner et al. | |
| 7,218,566 B1 | 5/2007 | Totolos et al. | |
| 7,620,693 B1 | 11/2009 | Mott et al. | |
| 7,620,749 B2 | 11/2009 | Biran et al. | |
| 7,760,741 B2 | 7/2010 | Biran et al. | |
| 7,924,848 B2 | 4/2011 | Biran et al. | |
| 8,213,315 B2 | 7/2012 | Crupnicoff et al. | |
| 8,576,715 B2 | 11/2013 | Bloch et al. | |
| 8,645,663 B2 | 2/2014 | Kagan et al. | |
| 8,677,031 B2 * | 3/2014 | Tamir | G06F 15/167 709/212 |
| 8,811,417 B2 * | 8/2014 | Bloch | G06F 9/546 710/48 |
| 9,639,398 B1 * | 5/2017 | Kusters | G06F 9/5033 |
| 10,089,145 B1 * | 10/2018 | Priescu | G06F 3/067 |
| 10,110,518 B2 * | 10/2018 | Burstein | H04L 49/9057 |
| 10,552,367 B2 * | 2/2020 | Burstein | G06F 15/17331 |
| 2001/0037406 A1 | 11/2001 | Philbrick et al. | |
| 2003/0172208 A1 | 9/2003 | Fidler | |
| 2004/0034718 A1 | 2/2004 | Goldenberg et al. | |
| 2004/0042483 A1 | 3/2004 | Elzur et al. | |
| 2004/0049600 A1 | 3/2004 | Boyd et al. | |
| 2004/0062267 A1 | 4/2004 | Minami et al. | |
| 2004/0148376 A1 | 7/2004 | Rangan et al. | |
| 2004/0187122 A1 | 9/2004 | Gosalia et al. | |
| 2004/0215746 A1 | 10/2004 | McCanne et al. | |
| 2005/0027902 A1 | 2/2005 | King et al. | |
| 2005/0108446 A1 | 5/2005 | Inogai | |
| 2005/0117430 A1 * | 6/2005 | Makhervaks | H04L 69/329 365/222 |
| 2005/0132077 A1 | 6/2005 | Biran et al. | |
| 2005/0246443 A1 | 11/2005 | Yao et al. | |
| 2006/0206635 A1 | 9/2006 | Alexander et al. | |
| 2007/0073915 A1 | 3/2007 | Go et al. | |
| 2007/0074091 A1 | 3/2007 | Go et al. | |
| 2007/0079185 A1 | 4/2007 | Totolos | |
| 2007/0162652 A1 | 7/2007 | Go et al. | |
| 2007/0204091 A1 | 8/2007 | Hofmann et al. | |
| 2007/0208820 A1 * | 9/2007 | Makhervaks | H04L 67/10 709/212 |
| 2008/0043750 A1 * | 2/2008 | Keels | H04L 69/12 370/395.52 |
| 2008/0109526 A1 | 5/2008 | Subramanian et al. | |
| 2010/0284397 A1 | 11/2010 | Poulin et al. | |
| 2012/0054381 A1 * | 3/2012 | Craddock | G06F 13/28 710/28 |
| 2013/0054726 A1 | 2/2013 | Bugge | |
| 2014/0181823 A1 * | 6/2014 | Manula | G06F 9/546 718/102 |
| 2014/0258438 A1 | 9/2014 | Ayoub | |
| 2015/0026368 A1 * | 1/2015 | Kagan | G06F 13/28 710/22 |
| 2015/0172226 A1 * | 6/2015 | Borshteen | H04L 49/9057 370/412 |
| 2015/0242324 A1 * | 8/2015 | Novakovic | G06F 12/0813 711/121 |
| 2017/0187846 A1 * | 6/2017 | Shalev | H04L 49/90 |
| 2017/0346742 A1 * | 11/2017 | Shahar | H04L 1/1635 |
| 2022/0217101 A1 * | 7/2022 | Yefet | H04L 49/253 |
| 2022/0407824 A1 * | 12/2022 | Yefet | G06F 13/385 |

FOREIGN PATENT DOCUMENTS

| | | | | |
|---|---|---|---|---|
| WO | 2004/021628 A2 | 3/2004 | | |
| WO | WO-2013095654 A1 * | 6/2013 | | G06F 13/14 |
| WO | WO-2021209132 A1 * | 10/2021 | | H04L 63/0428 |
| WO | WO-2021259483 A1 * | 12/2021 | | |

OTHER PUBLICATIONS

Infiniband Trade Association, "InfiniBandTM Architecture Specification", vol. 1, Release 1.2.1, pp. 1-1727, Nov. 2007.

* cited by examiner

TRANSACTION-BASED RELIABLE TRANSPORT

CROSS-REFERENCE TO RELATED APPLICATION

This application claims the benefit of U.S. Provisional Patent Application 63/337,222, filed May 2, 2022, which is incorporated herein by reference.

FIELD OF THE INVENTION

The present invention relates generally to packet communication networks, and specifically to processing of communications transmitted and received over such networks.

BACKGROUND

InfiniBand™ (IB) is a switched-fabric communications architecture that is widely used in high-performance computing. Computing devices (host processors and peripherals) connect to the IB fabric via a network interface controller (NIC), which is referred to in IB parlance as a channel adapter. Host processors (or hosts) use a host channel adapter (HCA), while peripheral devices use a target channel adapter (TCA). The IB architecture defines both a layered hardware protocol (Physical, Link, Network, Transport Layers) and a software layer, which manages initialization and communication between devices.

Processes executing on nodes of an IB network communicate with one another using a queue-based model. Sending and receiving processes establish a queue pair (QP), which consists of a send queue (SQ) and a receive queue (RQ). Send and receive work requests (WR) by a process running on a host cause corresponding commands, known as work queue elements (WQEs), to be loaded into these queues for processing by the HCA. The WQE causes the HCA to execute a transaction, in which a message containing data is transmitted over the network. The message data may be spread over the payloads of multiple, successive packets. The transaction may comprise, for example, a remote direct memory access (RDMA) read or write transaction or a SEND transaction. (To receive a SEND message on a given QP, a receive WQE indicating the receive buffer address is posted to that QP.) Upon completion of a WQE, the HCA posts a completion queue element (CQE) to a completion queue, to be read by the initiating process as an indication that the WR has been fulfilled.

Each QP is treated by the IB transport layer as a unique transport service instance. The transport layer is responsible for in-order packet delivery, partitioning, channel multiplexing and transport services. The transport layer also handles transaction data segmentation when sending and reassembly when receiving. Based on the Maximum Transfer Unit (MTU) of the path, the transport layer divides the data into packets of the proper size. A receiver reassembles the packets based on the Base Transport Header (BTH), which contains the destination queue pair and packet sequence number (PSN). The receiving HCA acknowledges the packets, and the sending HCA receives these acknowledgements and updates the completion queue with the status of the operation.

InfiniBand specifies a number of different transport services, including Reliable Connection (RC), Unreliable Connection (UC), Reliable Datagram (RD), and Unreliable Datagram (UD). RC provides a reliable transfer of data between two entities, which supports RDMA operations and SEND operations, as well as atomic operations, with reliable channel semantics. As a connection-oriented transport, RC requires a dedicated queue pair (QP) for each pair of requester and responder processes. Alternatives to the original RC model include the Extended Reliable Connected (XRC) transport service, which supports shared receive queues (SRQs) across one or more processes running on a given host; and reliable connections provided by the Dynamically-Connected (DC) transport service, as described, for example, in U.S. Pat. No. 8,213,315.

U.S. Pat. No. 10,110,518, whose disclosure is incorporated herein by reference, describes methods for handling transport-layer operations that are received out of order. A disclosed method of this sort includes receiving at a receiving node over a network from a sending node a succession of data packets belonging to a sequence of transactions, including at least one or more first packets belonging to a first transaction and one or more second packets belonging to a second transaction executed by the sending node after the first transaction, wherein at least one of the second packets is received at the receiving node before at least one of the first packets. At the receiving node, upon receipt of the data packets, data are written from the data packets in the succession to respective locations in a buffer. Execution of the second transaction at the receiving node is delayed until all of the first packets have been received and the first transaction has been executed at the receiving node.

SUMMARY

Embodiments of the present invention that are described hereinbelow provide improved methods and apparatus for transaction-based packet data communications.

There is therefore provided, in accordance with an embodiment of the invention, a method for communication, which includes receiving in a network device work requests posted by a host processor to perform a series of communication transactions, including at least a first transaction including first operations to be executed in a sequential order in response to corresponding first work requests and a second transaction including a second operation to be executed in response to a second work request posted by the host processor subsequently to the first work requests. In response to the work requests, data packets are transmitted over a network from the network device to a destination node and corresponding responses are received over the network from the destination node. Based on the received responses, completion of the first operations in the first transaction is reported from the network device to the host processor according to the sequential order of the first transaction. Based on the received responses, completion of the second operation in the second transaction is reported from the network device to the host processor regardless of whether the first transaction has been completed.

In some embodiments, the method includes establishing a reliable transport connection over the network between the network device and the destination node, wherein the data packets and responses belonging to both the first and second transactions are transmitted over the reliable transport connection. In a disclosed embodiment, the reliable transport connection provides a protocol for acknowledgment and retransmission of the data packets in each of the communication transactions independently of the other communication transactions in the series. Additionally or alternatively, the host processor submits both the first and the second work requests to a single queue pair (QP) that is associated with the reliable transport connection.

In a disclosed embodiment, the first and second operations include remote direct memory access (RDMA) operations.

Additionally or alternatively, the completion of the first operations is reported according to the sequential order of execution of the first operations regardless of an order in which the network device receives the corresponding responses.

Further additionally or alternatively, transmitting the data packets includes queuing the operations in the first and second transactions in respective first and second queues for execution by the network device, wherein the operations within each of the first and second queues are executed by the network device in queue order, while the operations in the second queue are executed by the network device without ordering constraints relative to the first queue.

In some embodiments, transmitting the data packets includes assigning different, respective transaction sequence numbers to the first and second transactions, and inserting the respective transaction sequence numbers in headers of the data packets transmitted by the network device. In one embodiment, the method includes, in response to the transaction sequence numbers in the data packets received at the destination node, queuing the operations for response by the destination node in the first and second transactions in respective first and second queues for execution by the destination node. Additionally or alternatively, transmitting the data packets includes, after transmission of a final data packet having a given transaction sequence number, conveying a notification from the network device to the destination node that the given transaction sequence number has been completed and retired.

There is also provided, in accordance with an embodiment of the invention, communication apparatus, including a network interface for connection to a network and a host interface, to receive work requests posted by a host processor to perform a series of communication transactions over the network, including at least a first transaction including first operations to be executed in a sequential order in response to corresponding first work requests and a second transaction including a second operation to be executed in response to a second work request posted by the host processor subsequently to the first work requests. Packet processing circuitry transmits, in response to the work requests, data packets over the network to a destination node and receives corresponding responses over the network from the destination node, and based on the received responses, reports completion of the first operations in the first transaction from the network device to the host processor according to the sequential order of the first transaction, while reporting completion of the second operation in the second transaction from the network device to the host processor regardless of whether the first transaction has been completed.

The present invention will be more fully understood from the following detailed description of the embodiments thereof, taken together with the drawings in which:

DETAILED DESCRIPTION OF EMBODIMENTS

Figure 1:
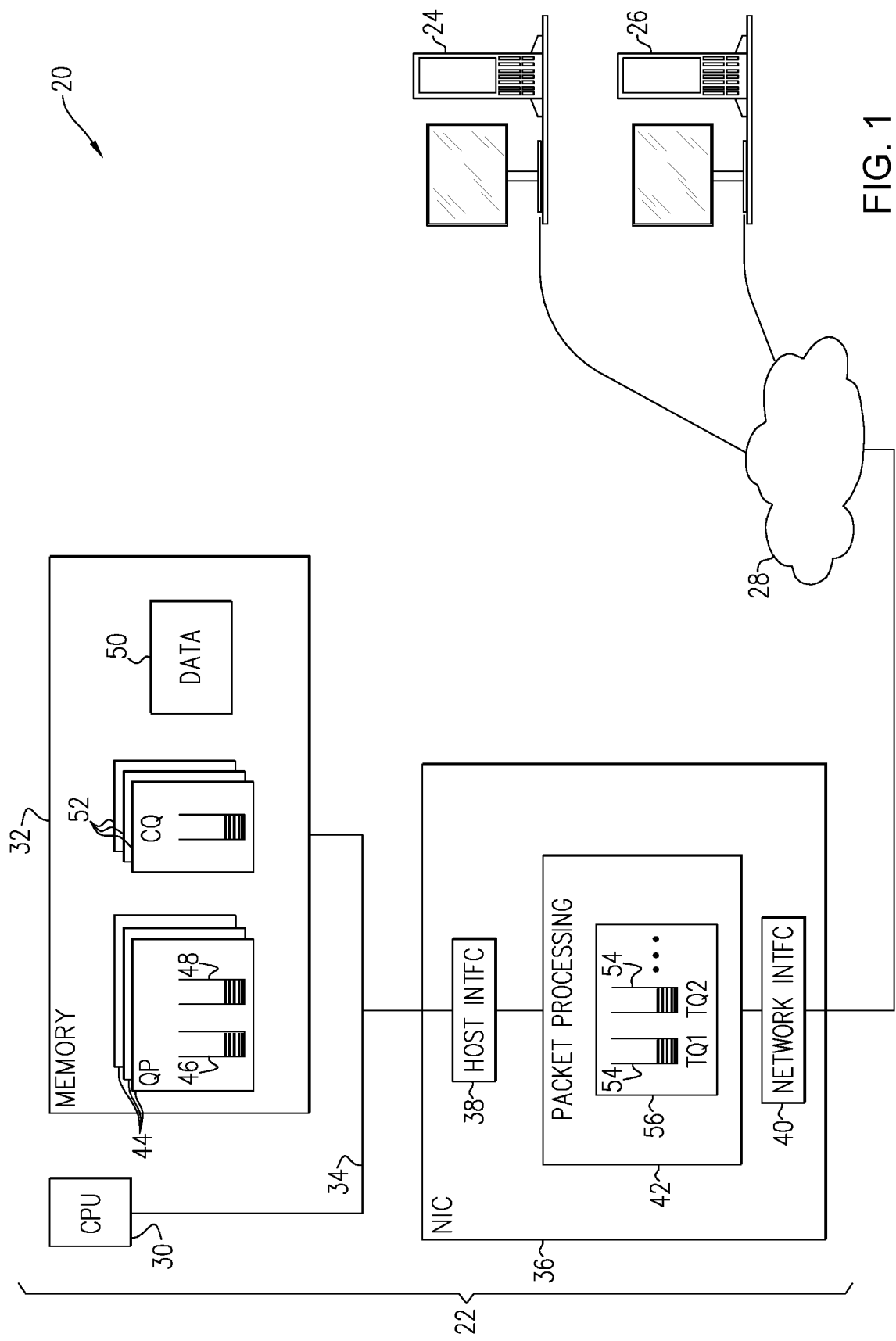
FIG. 1 is a block diagram that schematically illustrates a data communication system, in accordance with an embodiment of the invention.

InfiniBand (IB) specifications require that all packets transmitted on a given QP using a reliable transport connection be delivered to their destination in the order of transmission. This constraint on packet ordering simplifies and speeds the task of packet processing at the receiving NIC.

In many cases, however, an application running on a given network node may send several unrelated messages or sequences of messages to a peer application on another network node. In this case, the requirement to maintain ordering among the messages is unnecessary and in some cases may lead to packet loss, reduction in communication throughput, and impaired application performance. One solution to this problem could be to open multiple parallel QPs between the applications and to send the messages over different QPs. This approach, however, is inefficient, because it requires allocating memory and processing resources to each of the QPs individually.

Embodiments of the present invention that are described herein address this problem by enabling a single transport connection, and thus a single QP, to handle multiple independent transactions. Each transaction may comprise a single operation or multiple operations to be executed in a sequential order, in response to corresponding work requests. In posting the work requests to this single QP, the client application may indicate which work requests initiate new transactions or may provide ordering information enables the NIC to identify different transactions. Within each transaction, the NIC handles the operations in the designated sequential order. Among different transactions, however, no such ordering is required. The transport connection handles each transaction as a separate stream for purposes of reliability and packet ordering (including acknowledgment and retransmission of packets as necessary).

Thus, the disclosed embodiments provide a method for communication in which a network device, such as a NIC, receives work requests posted by a host processor to perform a series of communication transactions. Each transaction includes one or more operations, such as RDMA operations. At least some of the transactions comprise multiple operations to be executed in a sequential order in response to the sequential order of the corresponding work requests. In response to the work requests, the network device transmits data packets over a network to a destination node and receives corresponding responses over the network from the destination node. As noted above, the data packets and responses in the series of transactions are typically transmitted over the same transport connection, for example over a reliable transport connection.

Based on the responses received from the destination node, the network device reports the completion of the operations to the host processor. Within a given transaction, the network device submits completion reports to the host processor according to the sequential order of the operations in the transaction. (The sequential order of the completion reports within each transaction is maintained regardless of the order of the actual responses that the network device receives, i.e., even if a later operation in a given transaction is completed before a preceding operation in the same transaction, the completion reports are still submitted in the original order.) Among different transactions, however, the network device reports the completion of operations without regard to this ordering. In other words, the network device will report completion of an operation in a second transaction in the series regardless of whether or not any or all of the operations in a preceding first transaction have been completed.

FIG. 1 is block diagram that schematically illustrates a network data communication system 20, in accordance with an embodiment of the invention. System 20 comprises compute nodes 22, 24, 26, which are connected to communicate over a network 28. In the present example, network 28 is assumed to be an IB switched fabric. Alternatively, the principles of the present invention may be applied, mutatis mutandis, over packet communication networks operating in accordance with other protocols, such as Internet Protocol (IP) networks, and particularly protocols that support reliable transport connections.

Each compute node 22, 24, 26, . . . , comprises a host processor, such as a central processing unit (CPU) 30, which is connected by a peripheral component bus 34, such as a PCIe® bus, to a memory 32 and a NIC 36. (FIG. 1 shows details only of node 22 for the sake of simplicity.) NIC 36 links the compute node to network 28. Alternatively or additionally, system 20 may comprise other sorts of nodes, such as storage and/or dedicated processing nodes.

NIC 36 is connected to bus 34 through a host interface 38, comprising a suitable PCIe interface, for example. NIC 36 also comprises a network interface 40, in the form of one or more physical network ports configured for connection to network 28. Packet processing circuitry 42 in NIC 36 is connected between network interface 40 and host interface 38 and comprises both transmit and receive circuits for handling outgoing packets for transmission to network 28 and incoming packets received from network 28. Although FIG. 1 shows one possible implementation of NIC 36, other implementations will be apparent to those skilled in the art after reading the present description and are considered to be within the scope of the present invention.

For the sake of clarity, the physical components of NIC 36 are shown in FIG. 1 as multiple, separate functional blocks. In practice, however, these components are typically (although not necessarily) implemented as hardware and firmware components within a single integrated circuit chip or chipset, possibly together with CPU 40, as well. Interfaces 38 and 40 typically comprise suitable analog and digital hardware circuits, implementing the applicable physical layer and data link standards for communication over bus 34 and network 28, respectively. Packet processing circuitry 42 typically comprises hardware logic circuits, which may be programmable or hard-wired and are configured to carry out the functions described herein, as well as other packet processing functions that are known in the art. Additionally or alternatively, at least some of these functions can be carried out by an embedded processor in NIC 36 under the control of software or firmware.

The description that follows will focus on the functionality of packet processing circuitry 42 in handling RDMA traffic over reliable transport connections. In general, NIC 36 handles packet traffic of other sorts, but these other functions are beyond the scope of the present description.

CPU 30 runs an operating system, as well as user applications. To transmit and receive RDMA packets between applications running on CPU 30 and peer applications on other nodes in system 20, the applications open queue pairs (QPs) 44 in memory 32. Each QP 44 includes a send queue 46 and a receive queue 48, which serve as work queues to queue and deliver RDMA work requests posted by the applications for execution by NIC 36. Alternatively, the receive queue may be shared among multiple send queues. Each work request invokes a particular RDMA operation to be executed by NIC 36, and typically also indicates the address of a buffer 50 in memory where NIC 36 is to read or write data in executing the operation. Upon completion of an operation on a given QP 44, NIC 36 writes a completion report, known as a completion queue element (CQE), to a designated completion queue (CQ) 52 in memory 32.

In most cases, packet processing circuitry 42 executes the WQEs in any given QP 44 in the order in which they are posted, and likewise reports the completions of the WQEs in this same order. In other words, assuming first and second work requests are posted sequentially by an application in a certain QP, and circuitry 42 executes the corresponding first and second RDMA operations in sequential order, NIC 36 will report completion of the second operation only after the first operation has been completed, regardless of the order in which NIC 36 receives the corresponding responses from the peer application on node 24, for example. In other words, even if the second operation is completed before the first operation, circuitry 42 will wait to report completion of the second operation until the first operation has been completed, as well. This feature is useful in ensuring that the logical order and dependencies of the work requests and the corresponding RDMA operations is maintained from initiation through completion.

In some cases, however, an application may post a work request (or a sequence of work requests) to a given QP 44 that is independent of previous work requests in the queue. In such cases, in embodiments of the present invention, the application may mark such a work request (or the first in such a sequence of work requests) as initiating a new transaction. For this purpose, for example, the WQEs posted in send queue 46 may include a flag, which is set by CPU 30 to indicate the start of a new transaction. Alternatively, the WQEs may contain another sort of identifier to indicate ordering between different messages, such as a stream ID.

Packet processing circuitry 42 reads the WQEs from queue 46 in sequential order and queues them for execution in transaction queues 54 (marked TQ1, TQ2, . . . , in FIG. 1). Transaction queues 54 may be held in a memory 56 within NIC 36, for example, or they may alternatively be maintained in memory 32 or in another suitable memory. WQEs belonging to the same transaction are queued in order in the same transaction queue 54. When packet processing circuitry determines that a given WQE should initiate a new transaction, for example when the "new transaction" flag is set in a WQE, circuitry 42 opens a new transaction queue 54 and queues the WQEs in this new transaction queue until the next transaction is initiated. Circuitry 42 executes the operations invoked by the WQEs within any given transaction queue 54 in queue order, but without ordering constraints relative to the operations invoked by the WQEs in other transaction queues. In other words, WQEs in TQ2, belonging to a second transaction, may be executed before WQEs belonging to an earlier transaction that were posted previously in TQ1; and upon completion of an operation in the second transaction, circuitry 42 may write a CQE to the appropriate CQ 52 to report the completion regardless of whether the operations in the first transaction have been completed.

Circuitry 42 assigns a new transaction sequence number to each new transaction and inserts the transaction sequence numbers in data packets transmitted over network 28 to the destination node (for example, node 24 or 26). Typically, the transaction sequence number increases incrementally with each new transaction, in a manner known to both the source and destination nodes. In response to the transaction sequence numbers in the data packets received at the destination node, NIC 36 of the destination node queues the corresponding operations for response by the destination node in respective transaction queues for execution by the destination node. Nodes 22, 24, 26, . . . , apply the features of the applicable reliable transport protocol (for example, the InfiniBand RC transport service) independently to each transaction. Thus, the nodes implement acknowledgment and retransmission of data packets, when needed, in each of the transactions independently of the other transactions in the series.

After NIC 36 has transmitted the final data packet having a given transaction sequence number (and received an acknowledgment or other response from the destination node), NIC 36 conveys a notification to the destination node that the given transaction has been completed and retired. At this point, the corresponding transaction queues at both ends of the connection can be closed and the corresponding resources released.

Figure 2:
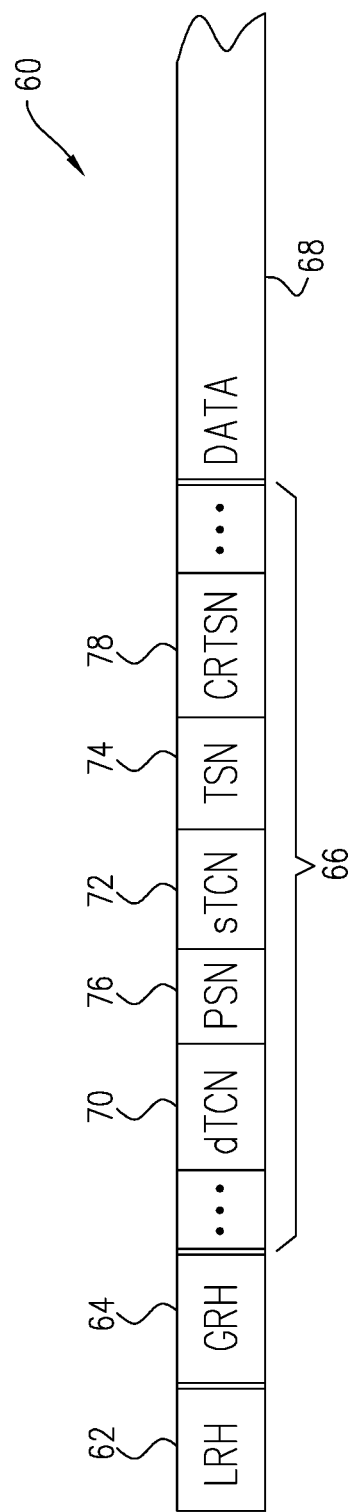
FIG. 2 is a block diagram that schematically illustrates a data packet, in accordance with an embodiment of the invention.

FIG. 2 is a block diagram that schematically illustrates a data packet 60, which includes transaction information in accordance with an embodiment of the invention. Although packet 60 is formatted in accordance with the conventions of IB protocols, other protocols, such as the IP family of protocols, may be similarly modified to incorporate transaction information of this sort. In accordance with IB protocols, the header of packet 60 begins with a conventional local routing header (LRH) 62 and global routing header (GRH) 64. A transport header 66 includes a basic transport header (BTH) and other sub-headers that are used in the reliable transport service. The headers are followed by a data payload 68.

Most of the fields in transport header 66 follow IB convention, but there are a number of fields that are added or changed to accommodate multiple transactions on the same QP:

A destination Transport Carrier Number (dTCN) 70 takes the place of the destination QP number in transport header 60, while a source Transport Carrier Number (sTCN) 72 takes the place of the source QP number.

A Transaction Sequence Number (TSN) 74 is incremented by packet processing circuitry 42 (FIG. 1) for each new transaction. The destination node uses the dTCN and TSN in identifying the QP and transaction queue to which packet should be steered.

A Packet Sequence Number (PSN) 76 is reset (for example to zero) for each new transaction, i.e., the packets are numbered sequentially within each transaction independently of the other transactions.

A Completed and Retired Transaction Sequence Number (CRTSN) 78 is set by processing circuitry 42 to indicate the highest TSN value satisfying the criterion that the corresponding transaction and all preceding transactions have been completed (meaning that all the operations in all the transactions have been completed and acknowledged). When CRTSN 78 is incremented in a packet to a given TSN, the responding node can retire the corresponding TSN, along with all preceding TSNs.

Figure 3:
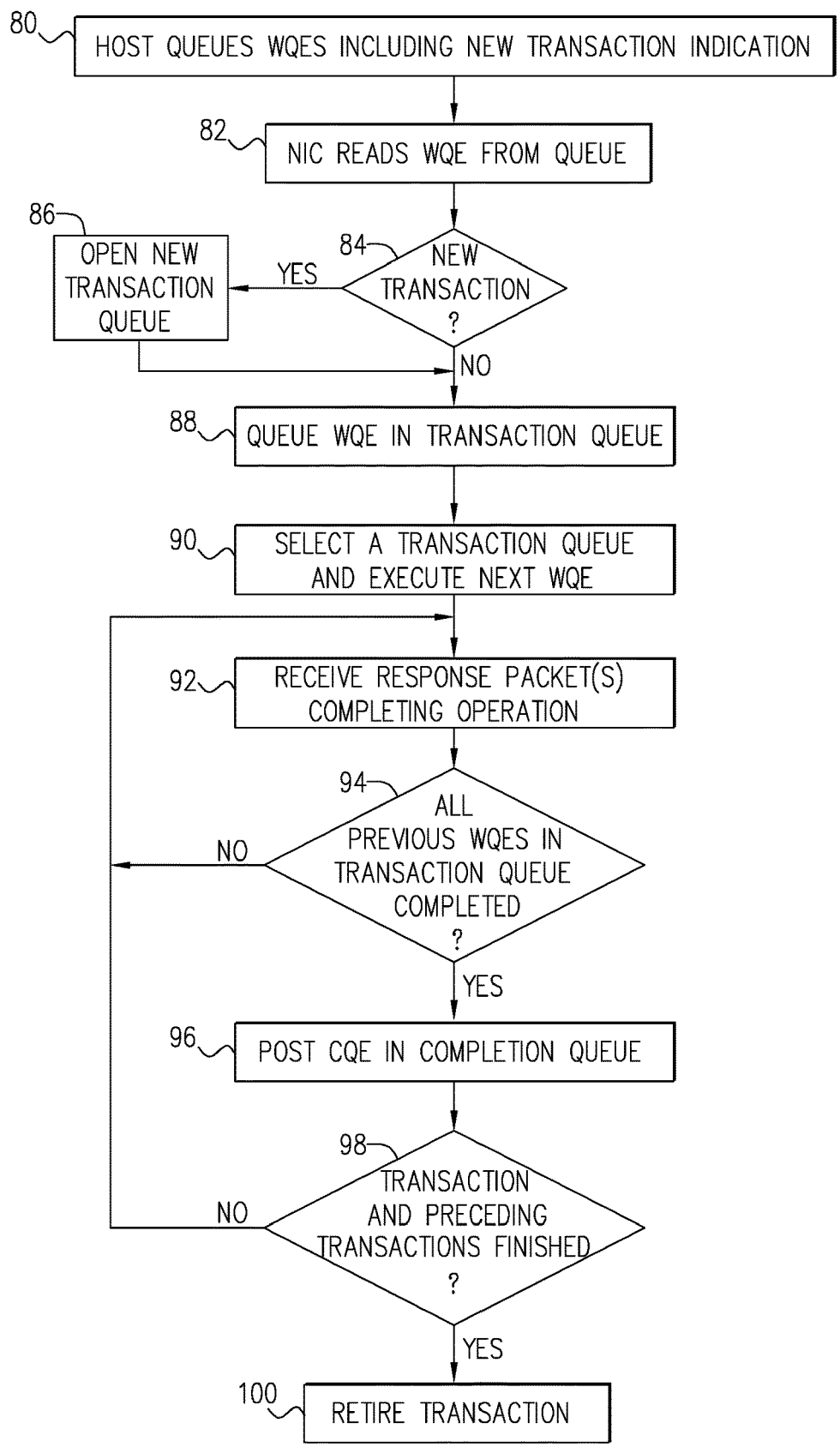
FIG. 3 is a flow chart that schematically illustrates a method for transaction-based data communications, in accordance with an embodiment of the invention.

FIG. 3 is a flow chart that schematically illustrates a method for transaction-based data communications, in accordance with an embodiment of the invention. For the sake of convenience and clarity, this method is described with reference to the elements of system 20 that are shown in FIG. 1. Alternatively, this method may be implemented, mutatis mutandis, in other packet communication networks having appropriate transport properties.

Application software running on CPU 30 submits work requests for execution by NIC 36; and driver software running on the CPU queues corresponding WQEs in the appropriate QP 44, at a WQE posting step 80. Upon instructions from the application software, some of the WQEs are flagged to indicate the beginning of a new transaction. NIC 36 reads the WQEs from queue 46 in queue order, at a WQE reading step 82. Processing circuitry 42 checks the "new transaction" flag or other new transaction indication in each WQE, at a transaction checking step 84. When the flag is set, the processing circuitry opens a new transaction queue 54, with a new TSN 74 (FIG. 2), at a new transaction step 86. Processing circuitry 42 queues the WQE for execution in the appropriate transaction queue (new or pre-existing), at a WQE queuing step 88.

Processing circuitry 42 chooses one of transaction queues 46 and executes the next WQE in the queue, at an execution step 88. In response to the WQEs, NIC 36 transmits data packets over network 28 to a destination node, such as node 24. As noted earlier, the WQEs in each transaction queue are executed in order, but there are no ordering constraints between WQEs in different queues. Thus, for example, if the operations in TQ1 are stalled for some reason, processing circuitry 42 may begin to execute the WQEs in TQ2.

NIC 36 receives response packets from destination nodes, at a response reception step 92. When processing circuitry 42 receives all responses (including data and/or acknowledgments) that are expected in a given operation, it marks the corresponding WQE as completed. Processing circuitry 42 checks whether all previous WQEs in the same transaction queue have been completed, as well, at a completion checking step 94. If so, processing circuitry 42 posts a corresponding CQE in the appropriate CQ 52, at a completion reporting step 96.

Upon completing an operation and posting the corresponding CQE, processing circuitry 42 checks whether any further WQEs remain to be executed in this same transaction queue 54, at a transaction completion checking step 98. Processing circuitry 42 also checks whether all previous transactions have also been completed. If both these conditions are satisfied, processing circuitry 42 retires the present transaction, at a retirement step 100. The processing circuitry reports this retirement to node 24 by setting the value of CRTSN 78 (FIG. 2) to the TSN of the retired transaction in the next packet transmitted from QP 44. Once node 24 has acknowledge this packet, the transaction is retired.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
receiving in a network device work requests posted by a host processor to perform a series of communication transactions, including at least a first transaction comprising first operations to be executed in a sequential order in response to corresponding first work requests and a second transaction comprising a second operation to be executed in response to a second work request posted by the host processor subsequently to the first work requests;

in response to the work requests, transmitting data packets over a network from the network device to a destination node and receiving corresponding responses over the network from the destination node;

based on the received responses, reporting completion of the first operations in the first transaction from the network device to the host processor according to the sequential order of the first transaction; and based on the received responses, reporting completion of the second operation in the second transaction from the network device to the host processor regardless of whether the first transaction has been completed.

2. The method according to claim 1, and comprising establishing a reliable transport connection over the network between the network device and the destination node, wherein the data packets and responses belonging to both the first and second transactions are transmitted over the reliable transport connection.

3. The method according to claim 2, wherein the reliable transport connection provides a protocol for acknowledgment and retransmission of the data packets in each of the communication transactions independently of the other communication transactions in the series.

4. The method according to claim 2, wherein the host processor submits both the first and the second work requests to a single queue pair (QP) that is associated with the reliable transport connection.

5. The method according to claim 1, wherein the first and second operations comprise remote direct memory access (RDMA) operations.

6. The method according to claim 1, wherein the completion of the first operations is reported according to the sequential order of execution of the first operations regardless of an order in which the network device receives the corresponding responses.

7. The method according to claim 1, wherein transmitting the data packets comprises queuing the operations in the first and second transactions in respective first and second queues for execution by the network device, wherein the operations within each of the first and second queues are executed by the network device in queue order, while the operations in the second queue are executed by the network device without ordering constraints relative to the first queue.

8. The method according to claim 1, wherein transmitting the data packets comprises assigning different, respective transaction sequence numbers to the first and second transactions, and inserting the respective transaction sequence numbers in headers of the data packets transmitted by the network device.

9. The method according to claim 8, and comprising, in response to the transaction sequence numbers in the data packets received at the destination node, queuing the operations for response by the destination node in the first and second transactions in respective first and second queues for execution by the destination node.

10. The method according to claim 8, wherein transmitting the data packets comprises, after transmission of a final data packet having a given transaction sequence number, conveying a notification from the network device to the destination node that the given transaction sequence number has been completed and retired.

11. Communication apparatus, comprising:
a network interface for connection to a network;

a host interface, to receive work requests posted by a host processor to perform a series of communication transactions over the network, including at least a first transaction comprising first operations to be executed in a sequential order in response to corresponding first work requests and a second transaction comprising a second operation to be executed in response to a second work request posted by the host processor subsequently to the first work requests; and packet processing circuitry, to transmit, in response to the work requests, data packets over the network to a destination node and receive corresponding responses over the network from the destination node, and based on the received responses, to report completion of the first operations in the first transaction from the network device to the host processor according to the sequential order of the first transaction, while reporting completion of the second operation in the second transaction from the network device to the host processor regardless of whether the first transaction has been completed.

12. The apparatus according to claim 11, wherein the packet processing circuitry is to establish a reliable transport connection over the network with the destination node, wherein the data packets and responses belonging to both the first and second transactions are transmitted over the reliable transport connection.

13. The apparatus according to claim 12, wherein the reliable transport connection provides a protocol for acknowledgment and retransmission of the data packets in each of the communication transactions independently of the other communication transactions in the series.

14. The apparatus according to claim 12, wherein the host processor submits both the first and the second work requests to a single queue pair (QP) that is associated with the reliable transport connection.

15. The apparatus according to claim 11, wherein the first and second operations comprise remote direct memory access (RDMA) operations.

16. The apparatus according to claim 11, wherein the processing circuitry is to report completion of the first operations according to the sequential order of execution of the first operations regardless of an order in which the network device receives the corresponding responses.

17. The apparatus according to claim 11, wherein the packet processing circuitry is to queue the operations in the first and second transactions in respective first and second queues for execution by the network device, and to execute the operations within each of the first and second queues in queue order, while executing the operations in the second queue without ordering constraints relative to the first queue.

18. The apparatus according to claim 11, wherein the packet processing circuitry is to assign different, respective transaction sequence numbers to the first and second transactions, and to insert the respective transaction sequence numbers in headers of the data packets transmitted over the network.

19. The apparatus according to claim 18, wherein in response to the transaction sequence numbers in the data packets received at the destination node, the operations are queued for response by the destination node in the first and second transactions in respective first and second queues for execution by the destination node.

20. The apparatus according to claim 18, wherein after transmission of a final data packet having a given transaction sequence number, the packet processing circuitry is to convey a notification to the destination node that the given transaction sequence number has been completed and retired.

* * * * *